(12) United States Patent
Kanevsky

(10) Patent No.: US 6,988,279 B1
(45) Date of Patent: Jan. 17, 2006

(54) INTELLIGENT AGENT AUTHENTICATION VIA POSITION LOCATOR SYSTEM

(75) Inventor: Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 09/580,720

(22) Filed: May 30, 2000

(51) Int. Cl.
*G06F 7/04* (2006.01)

(52) U.S. Cl. .................................. 726/2; 726/3; 726/4

(58) Field of Classification Search ................. 380/270, 380/271, 258; 713/166, 168–170, 172, 176, 713/178, 182, 185, 192–194, 200–201; 705/65; 707/9, 10; 455/515, 433, 556.2, 91, 95; 701/200, 701/213; 235/375, 382, 380; 709/202; 340/426.1, 340/426.19, 426.18; 726/2–4, 27–30

See application file for complete search history.

(56) References Cited

U.S. PATENT DOCUMENTS

| | | | | |
|---|---|---|---|---|
| 5,629,981 A | * | 5/1997 | Nerlikar | 713/168 |
| 6,025,780 A | * | 2/2000 | Bowers et al. | 340/572.3 |
| 6,490,680 B1 | * | 12/2002 | Scheidt et al. | 713/166 |

OTHER PUBLICATIONS http://www.computer.org/concurrency/pd1999/pdf/p3080.pdf.
http://agents.umbc.edu (AgentWeb: Publications and presentations: Recommended Papers).
http://www.botspot.com/news/000327ecommerce.html.
http://smartpush.cs.hut.fi/SoftwareAgents/Seminarpapers/Mobile_Agents/Mobile_Agents.htm.

* cited by examiner

*Primary Examiner*—Hosuk Song
(74) *Attorney, Agent, or Firm*—Ference & Associates

(57) ABSTRACT

The authentication of intelligent agents (IA's) using a position locator system (PLS). Particularly contemplated is the comparison of the physical position of an intelligent agent requiring access to that of an intelligent agent whose identity is claimed by the former intelligent agent.

21 Claims, 3 Drawing Sheets

INTELLIGENT AGENT AUTHENTICATION VIA POSITION LOCATOR SYSTEM

FIELD OF THE INVENTION

The present invention relates to the authentication of Intelligent Agents.

BACKGROUND OF THE INVENTION

Intelligent Agents (IA's) are special program packets that can move in a network from one computer to another. A general discussion of IA's may be found in the following web-based publications: [http://]www.computer.org/concurrency/pd1999/pdf/p3080.pdf; [http://]agents.umbc.edu (AgentWeb: Publications and presentations: Recommended Papers); [http://]www.botspot.com/news/000327ecommerce.html. "Mobile agents", representing an alternative term for IA's, and as contemplated in the cellular telephone industry, are discussed in [http://]smatpush.cs.hut.fi/SoftwareAgents/Seminarpapers/Mobile_Agents/Mobile_Agents.htm.

Essentially, and as can be appreciated from the references cited above, IA's are entities that are capable of performing intelligent tasks inside computers. For example, IA's can visit servers connected to a network in order to find security breaches in these servers. IA's can also be given tasks to visit home pages and collect advertisements that are posted on such home pages.

It is expected that, in the future, IA's will be widely available and will be capable of performing tasks now requiring manual prompting or intervention. For instance, it is conceivable that one could send an IA to "visit" several shopping sites on the Internet to undertake the buying of goods, given a set of parameters for conducting the shopping (e.g., desired items, price range, etc.). Similarly, an IA could be directed to process bank accounts, buy stocks, pay credit cards, etc.

It will be appreciated, though, that since IA's are usually in the form of programs, they can be copied, perhaps by criminal elements, in order to perform illegal or unauthorized tasks. The potential also exists, of course, for criminal elements to produce their own IA's for intruding other computers (e.g., to illegally access someone's bank account). Accordingly, IA's could potentially be produced by hackers in the form of viruses or worms and could, as such, enter computers from infected disks and/or programs.

Consequently, it would appear that as the use of IA's increases, there will be increased importance placed on preventative measures against the illegal or unauthorized use of IA's. Its presently contemplated that IA's have some dedicated arrangement for self-identification (e.g., with ping numbers, names, digital signatures). (For instance, self-identification is contemplated in [http://]smaprtpush.cs.hut.fi/SoftwareAgents/Seminarpapers/Mobile_Agents/Mobile_Agents.htm.) It is believed, however, that such measures would not be foolproof, since the possibility exists that a hacker could copy an IA and adequately assess its functions (for instance, essentially any program that is moving in a network could be copied using devices that copy the program bit-by-bit, much as when a pirate copies programs on CD-ROMs).

A need has thus been recognized in connection with providing more effective measures that improve IA authentication in comparison with previous efforts.

SUMMARY OF THE INVENTION

In accordance with at least one presently preferred embodiment of the present invention, the use of a Position Locator System (PLS) is broadly contemplated, for identifying the precise location of an Intelligent Agent (IA) (e.g., in which computer or switch, etc.). Particularly contemplated herein is the introduction of a new type of security measure that verifies, via an individual PLS, where the IA is located. Essentially, if the IA requiring access at a given place (e.g. a website or bank account) has coordinates that do not coincide with those that were obtained from the individual PLS, then the IA may be considered to be intrusive.

As a security measure, the IA that requires access to a particular site, service or operation will require an associated individual PLS. When the IA identifies itself to the security system (e.g., entering an identification number in an ATM [automatic teller machine]), the security system will preferably sends a request to the central PLS to verify where thy IA with the corresponding (entered) "identity" is located. The central PLS thence preferably communicates with the individual PLS associated with the all IA's bearing that "identity". Accordingly, the central PLS system will become apprised of the exact location of a candidate set of individual PLS's. The central PLS then preferably sends these coordinates to the security system. Preferably, the security system will then compare the coordinates that are obtained over the network from individual PLS's with the coordinates of the system where the IA is located and that requested access. (The coordinates of the IA that requested access can be obtained, from the location of the input arrangement used by the IA attempting access, for instance, the location of an ATM being operated.) If the coordinates do not match then the request for access is rejected.

The security system discussed above could potentially be buttressed with a local IA authentication system that accompanies an individual PLS, for instance, a local IA authentication system that checks digital signatures to authenticate an IA.

Broadly contemplated herein is an improved system and method for authentication of Intelligent Agents that is based on verifying the location of IA's.

Also broadly contemplated herein is the use of a global position locator system and local IA authentication measures to verify location of an IA that requires access to secured locations, accounts, and/or information.

Broadly contemplated herein, as well, is an improved system and method for improving copyright protection of applications based on verifying the location of applications. (An "application" may be embodied, for instance, by a word processing program, a video game, or essentially any software item to be run on a computer.)

In one aspect, the present invention provides a system for authenticating an intelligent agent, the system comprising: an identifier which ascertains the location and identity of an entry intelligent agent attempting to gain access to the location, the identity being ascertained via an identification tag associated with the intelligent agent; a general register of identification tags corresponding to a plurality of intelligent agents and of possible locations at which the registered intelligent agents may gain access; and a threshold manager which permits access, to a given location, of an entry intelligent agent that corresponds to at least one intelligent agent in the general register.

In another aspect, the present invention provides a method of authenticating an intelligent agent, the method comprising the steps of: ascertaining the location and identity of an entry intelligent agent attempting to gain access to the location, the identity being ascertained via an identification tag associated with the intelligent agent; providing a general register of identification tags corresponding to a plurality of intelligent agents and of possible locations at which the registered intelligent agents may gain access; and permitting access, to a given location, of an entry intelligent agent that corresponds to at least one intelligent agent in the general register.

Furthermore, in another aspect, the present invention provides a program storage device readable by machine, tangibly embodying a program of instructions executable by the machine to perform method steps for authenticating an intelligent agent, the method comprising the steps of ascertaining the location and identity of an entry intelligent agent attempting to gain access to the location, the identity being ascertained via an identification tag associated with the intelligent agent; providing a general register of identification tags corresponding to a plurality of intelligent agents and of possible locations at which the registered intelligent agents may gain access; and permitting access, to a given location, of an entry intelligent agent that corresponds to at least one intelligent agent in the general register.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
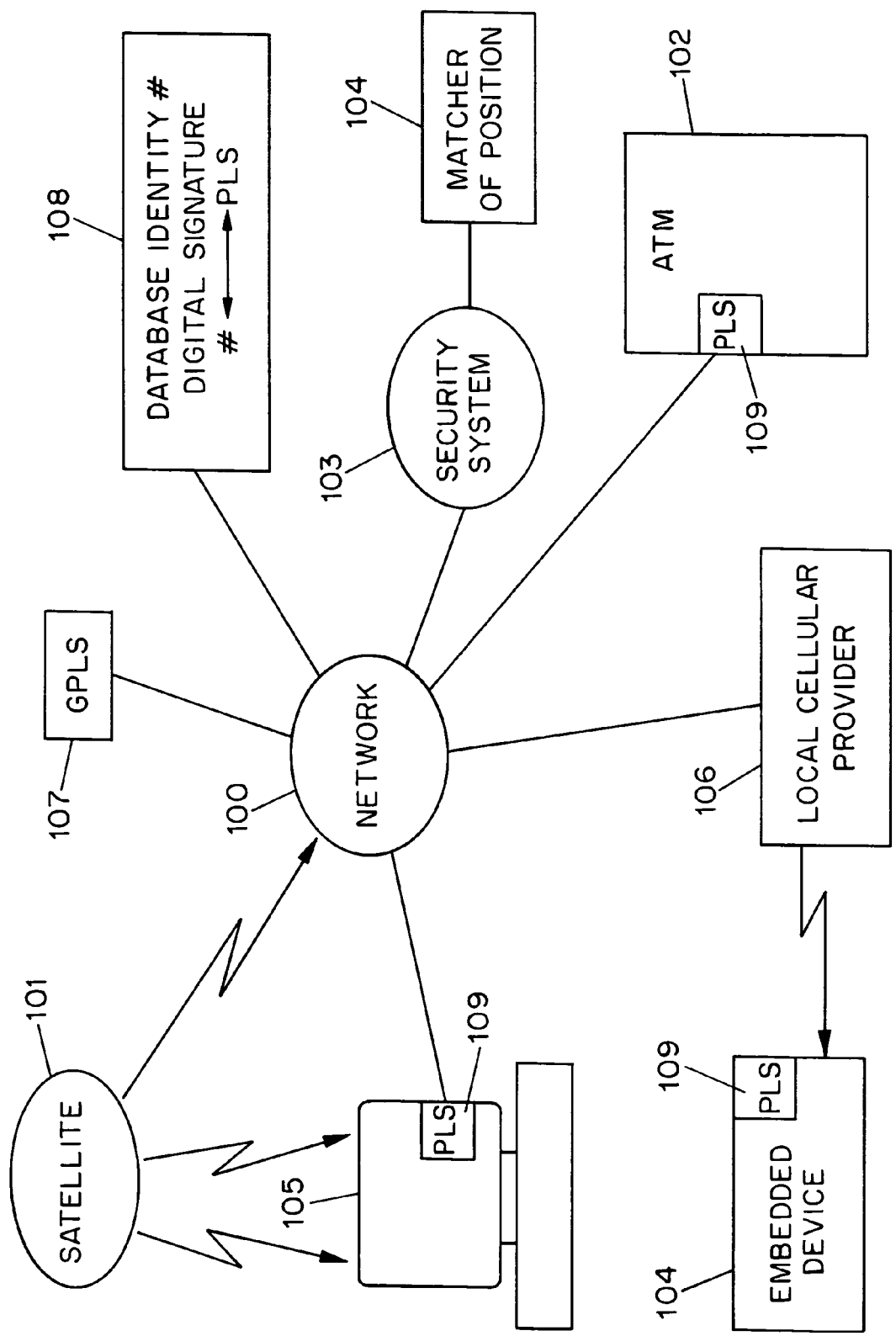
FIG. 1 is a schematic diagram of an embodiment of the present invention.

The present invention, in accordance with at least one presently preferred embodiment, broadly contemplates ascertaining the position of an IA in order to authenticate it. More particularly, if an IA requests access to a secured system and if it is necessary to check whether this IA is not an illegal copy then one can do as described below.

Preferably, an IA will present its unique identification number (ping). In order to check that this is not a duplicate of another IA, it is conceivable at this point to check whether there is indeed another IA somewhere in the network with the same identification number. For this purpose, one can send a special signal, that includes the IA identification number, to all network servers. If another IA with the same identification number is indeed detected somewhere, then it will mean that at least one IA is a false duplicate.

It is contemplated herein that, in order to locate the position of an IA, one can use a method similar to that used for finding the location of a cellular telephone by calling a telephone number. Particularly, when cellular phones are in an active mode, they send signals that can be received by cellular providers. The cellular provider that receives the strongest signal will enter the telephone number of this telephone in a special central database, inasmuch as the telephone number may be thought of as an identification number, that is, a number that uniquely identifies the telephone. When another party calls this telephone number, a special program checks the central database to find which local provider has a connection to the cellular telephone. When it finds such a provider, it sends a message to the provider. The cellular provider forwards the message to the cellular telephone corresponding to the number in question. In this manner, the cellular telephone is located by way of its telephone number and the communication link is established.

It is contemplated herein that, in the case of IA's, a similar approach is possible. Particularly, when an IA enters a server or client/embedded device connected to a server, the server preferably will send the identification number of this IA to a central database (as opposed to a telephone number as in the case of a cellular telephone as discussed above) along with the coordinates/names of the server (or client/embedded device). When an IA requests permission to enter some service entity (e.g., a bank account) or otherwise perform some operation, the IA will preferably present its identification number to the server. The server will then preferably send this identification number to some security server. The security server will preferably scan databases that contain the identification numbers and locations of IA's. If it is found that there is some IA with the same identification number that is located in the different place, the security server will inform the appropriate server about this and the IA will be denied access to services provided by this server.

As shown in FIG. 1, a security network system (100) for verifying user identity may preferably include one or more input communication units connected to a network (e.g., an input terminal at ATM 102 or PC 105), and one or more global positioning locator systems connected to the network (e.g., a central PLS located on satellites 101 and an individual PLS located in portable embedded devices 104, such as watches or cellular phones).

It should be understood that the term position locator system (PLS) is not to be confused with another common term, global positioning system (GPS). The difference between PLS and GPS lies in the fact that a PLS typically transmits location coordinates back to some server. GPS, on the other hand, can usually define a position (for example from signals that it receives from satellites) but does not typically send its coordinates back to the satellite.

Figure 3:
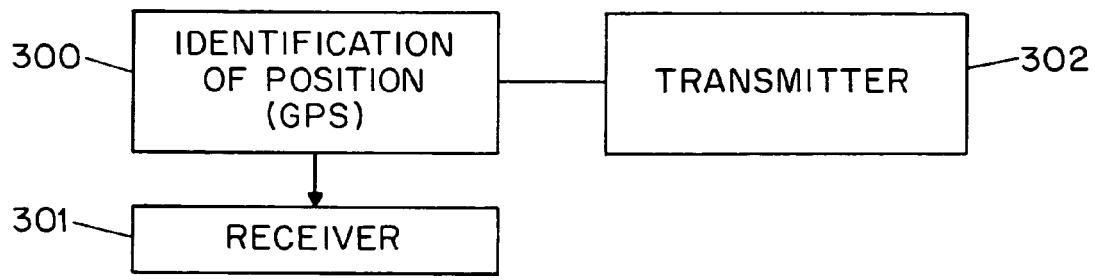
FIG. 3 is a schematic block diagram of PLS.

Preferably, a global positioning locator system (including a central PLS 101 interacting with individual PLS 104) identifies the position IA's in computers and portable devices that are associated with individual PLS 104. It can be used in special situations when there are isolated networks or computer systems that are equipped with a local PLS that can receive signals from satellites (or cellular providers). An isolated network or computer system, in this context, is indicative of a system that is not connected to other global network systems (that have databases with identification numbers of IA's) and therefore have special measures associated with sending information from the local network on whether there is an IA with a certain identification number. These special measures can include, for example, cellular telephones that are capable of sending wireless signals to local cellular providers that themselves are connected to global networks or to powerful broadcasting stations that can send signals far away (to satellites or other servers) with information regarding the location of IA's. A general PLS is schematically illustrated in FIG. 3 and will be discussed in more detail further below.

Preferably, the "embedded" devices that are located on a person, such as watches, telephones, digital wallets etc.

(104) and that contain a PLS, can, at a given time, be in an active mode or a passive mode. In the active mode, device 104 will be connected to a network (e.g., via wireless measures) and can receive an IA. In the passive mode, they are not receiving any signals from a network. The embedded devices can periodically go into active mode to download some data from global networks. They can receive an IA and then disconnect from network. To detect such an IA, it is desirable to equip embedded devices with a PLS that can receive and send signals regardless of whether embedded devices are in passive or active mode.

In one embodiment of the present invention, a PLS can include a GPS arrangement that would allow for precisely identifying the position of a device in which a GPS is located. Such an exact identification of position may be needed since the local server provider position might only be able to approximate a range as to the location of devices that are connected to the local server provider. A brief discussion of the use of GPS in defining a precise position ensues.

Essentially, GPS satellites are highly accurate atomic clocks. They broadcast their current time using extremely wideband signals. The receiver picks up the time from (at least) four satellites and measures the difference in arrival times from each. Because the satellites are at known coordinates in geosychronous orbit, the differences in arrival time of the radio signals can be used to determine the distance the receiver is from each satellite. This is normally accurate to a few meters. However, the military perturbs the time signals using random noise to control the accuracy in what is known as "selective availability." This hopefully foils use of the GPS system by other entities.

There also exist D-GPS's, or differential GPS systems, in which case a fixed ground based transmitter sends its location and time to a D-GPS receiver. These systems send "corrections" to the time signals that are perturbed by the military. In so doing, the GPS accuracy can jump to a few meters.

Using more advanced techniques, for stationary objects, it is possible to actually achieve accuracy in the centimeter range (essentially using a form of interferometry). In any case, there is no signal sent out from the GPS receivers. They know where they are relative to the GPS satellites, which are all in known spatial coordinates.

The precise identification of IA's (or, more particularly, of the devices in which they are located) may be needed since there can be several IA's (some of which are intrusive) with the same identification numbers in the proximity of a local cellular provider (but located in different devices). By combining a GPS with measures to send their location to a server, a PLS is realized.

Figure 2:
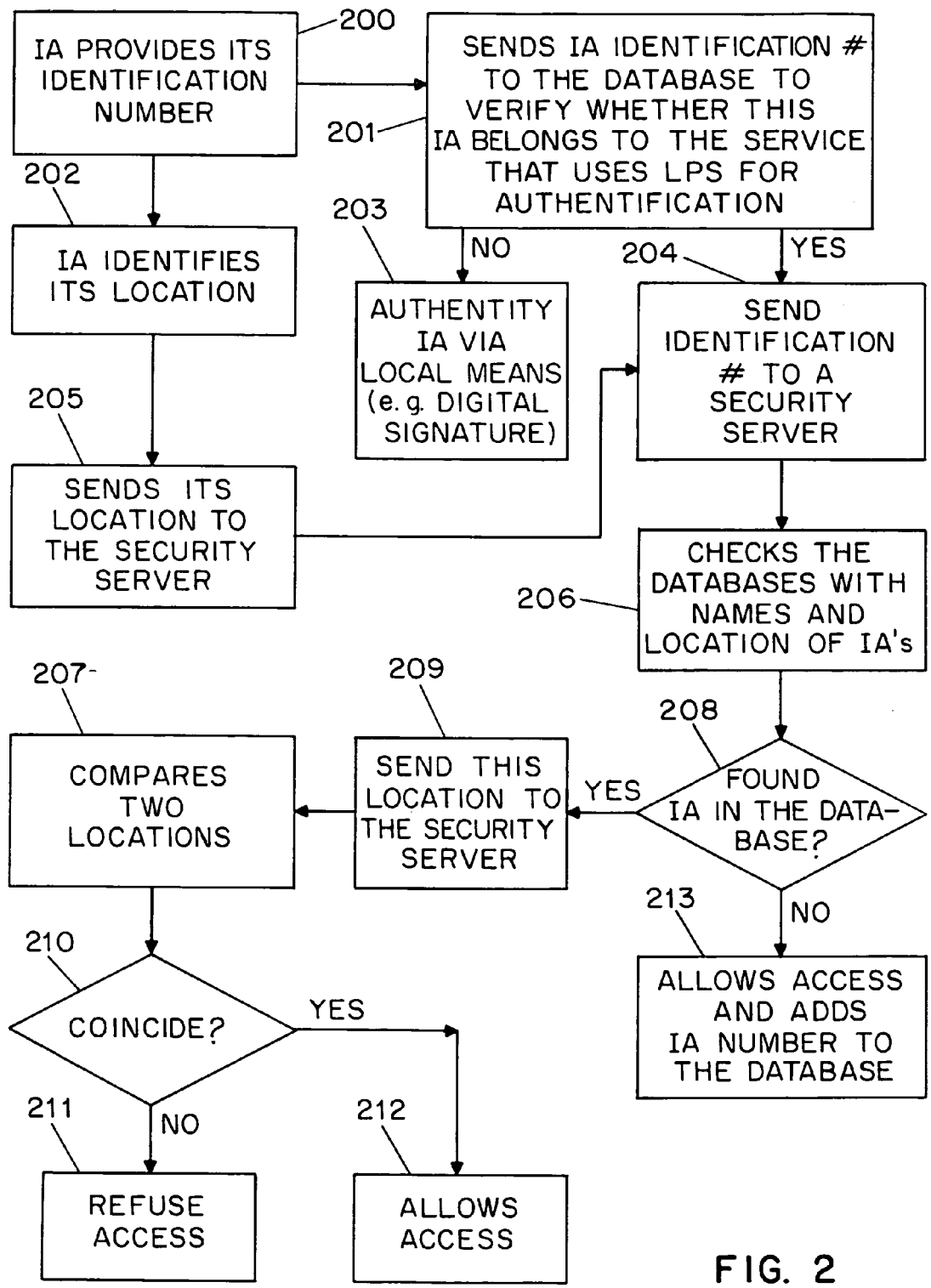
FIG. 2 if a flow chart of an inventive method.

As shown in FIG. 2, a method of verifying user identity may include several steps. First (200), an IA may provide its identification number by communicating with a server or embedded device to the effect that performance of a particular operation, or entry into a particular entity, is desired.

Then (201), the IA identification number is preferably sent to the database to verify whether any IA with that identification number belongs to the service that uses the PLS in question.

Next (202), the IA identifies its location (for instance, by identifying a location of a local cellular provider that is linked to a computer system into which the IA wants to enter, or by utilizing a GPS subsystem in the PLS).

At step 203, if it is determined that no such link exists, access is rejected or, perhaps, another type of verification is requested (e.g., a digital signature is requested). In other words, if for some reason the system cannot identify the location of the IA, then it will preferably either reject the IA request at hand or defer to some type of local arrangement (e.g., a request for a digital signature). As a non-restrictive example, a system might defer to a local identification arrangement if there is no local cellular provider that could have received a signal form a PLS that is associated with the agent.

However, at step 204, if it is determined that a link does exist, then the IA identification number is sent to a security server.

At step 206, the security server will preferably check the database(s) that contain(s) identification numbers and locations of IA's.

At step 208, if the IA identification number is found in the database, then the location corresponding to that identification number (as stored in the database) is sent to the security server (209); otherwise, the security server permits IA access to the computer and adds the IA identification number to the database.

At step 205, after step 200, the IA's location is sent to the security server. At step 207, the two locations (i.e., those derived from steps 205 and 209) are compared and, at step 210, a determination is made as to whether the two positions coincide. If yes, access is allowed (212), while if no, access is rejected (211).

As to running a comparison in step 207, the exactness required of the match may depend on several factors, including the type of services that the IA requested. For example, if the IA requests access to an ATM, then it would likely merely suffice if the location of the IA can be defined at a level of precision sufficient to distinguish between the location of the ATM at hand and that of the nearest other ATM. However, if there are, for example, two ATM's near a cellular provider and both ATM's receive requests for access from IA's within a short period of time, and if the location of the IA in this instance is defined only in terms of the cellular provider that receives the strongest signal from the IA, then at that level of precision (in locating an IA), it might not be clear as to whether two different IA's have requested access to two different ATM's or if the same IA requested access to the two IA's in relatively quick succession. In this case, it may be warranted to include a more precise measure for ascertaining IA locations, such as a GPS, that could be used as a supplement.

Another possible criterion for permitting or denying access of an IA to a given location may be time-based. Particularly, an IA could be denied access to a given location or locations if it is ascertained that the IA has requested access two different locations within a period of time that is less than a predetermined threshold time value, such as a period of time, within a small margin of error, normally deemed as a minimum amount of time required for an IA to access two different locations in succession. Thus, for instance, if the same identification number (associated with an IA) is obtained from different locations for which the IA has requested access over a period of time less than the threshold, then this may be deemed a suspicious factor that warrants the denial of access to the IA at a location. On the other hand, if a sufficient amount of time (i.e., greater than the predetermined threshold value) has elapsed then access of the IA to a location may be permitted. It will be understood that precise correlations between times and locations, and thus setting the threshold time value, may depend on such factors as the speed with which an IA can travel across the network in question, etc.

FIG. 3 is a brief schematic overview of a PLS. As shown, a module 300 may be employed to identify the position of the IA. Preferably, it will operate in a similar manner as a GPS. Module 300 could even be embodied by a GPS or GPS component, especially if the level of precision brought about by GPS is desired.

Indicated at 301, on the other hand, is a receiver module. Module 301 will thus preferably obtain signals (e.g., from a satellite or cellular provider) that provides information about the position of the IA. The receiver module 301 could be in the form of a cellular module, radio receiver, modem, port or the like. Information about the IA position is preferably transferred by a transmitter 302 to a server (such as the security server 103 shown in FIG. 1).

Figure 4:
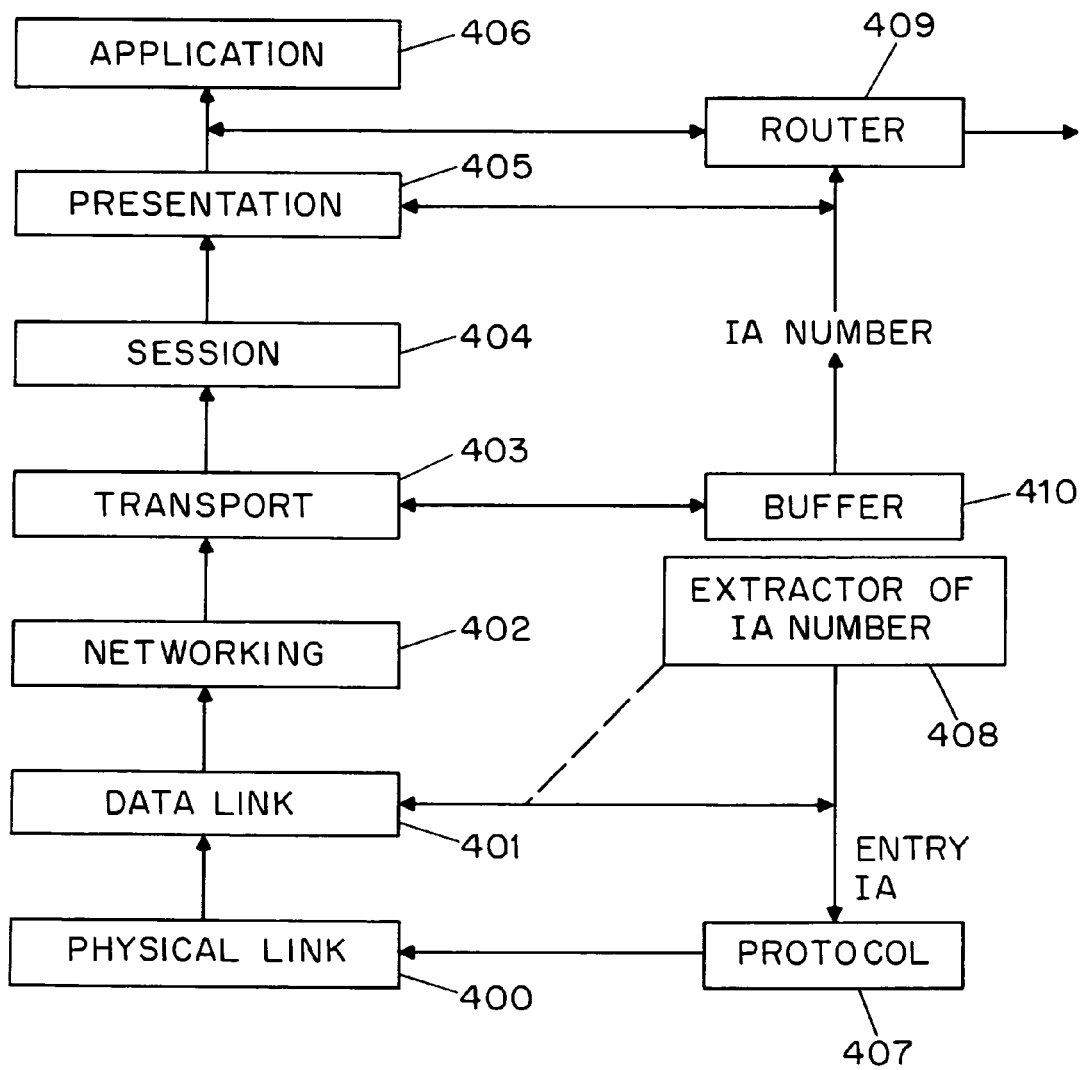
FIG. 4 is a schematic representation of communication between IA and a computer.

FIG. 4 schematically illustrates the entry of an IA in open systems interconnection (OSI) architecture.

Preferably, when an IA enters some type of computer facility, it should be stopped at some point before it is authenticated. Otherwise, if an IA is permitted to proceed far into the computer system, it can harm the computer, particularly into parts of the computer susceptible to harm (e.g., computer memory or other components normally susceptible to viruses and worms). Thus, as a working example, FIG. 4 schematically illustrates OSI architecture and how an IA can be processed there in accordance with an embodiment of the present invention.

There exist different types of (closed) networks that may require different communication protocols. Networks that offer support for communication between many types of systems without protocol conversions are open because they allow open access to many other facilities. A system connected to such a network is called an open system. As the need for greater interfacing between disparate and diverse machines became apparent, a program of protocol standardization was developed, which led to the creation of the open systems interconnection (OSI). FIG. 4 thus illustrates how novelty segregation module features can fit OSI architecture.

The OSI typically includes seven layers—physical link, data link, networking, transport, session, presentation, application (400–406, respectively). A description of these layers functions can be found in Gill Waters, "*Computer communication networks*", 1991, McGraw-Hill Book Company, England.

Concerning the manner in which OSI architecture can preferably be related to some IA authentication features, in accordance with an embodiment of the present invention, the IA interacts with a protocol 407 that can be located in physical communication devices (like modems) and therefore is linked to physical link layer 400, as shown in FIG. 4.

The module 410 that operates with a flow of bits and represents a stream of bits as 1's and 0's can preferably read the identification IA number. This module 410 can be located in the data link layer 501 that processes bit streams from data communication link. Another possible location of module 410 is a buffer in a transport layer 404, since the transportation block provides a flow control and contains buffer where bits from communication links are accumulated. Similarly, the reading of an IA identification number could be undertaken in a presentation layer 401.

The application layer 406 involves application programs and destination communication devices and therefore can preferably include a special application that stops IA from moving further until IA authentication is complete. Thus, in accordance with the embodiment illustrated in FIG. 4, application layer 406 may be considered to be a final "stopping" point for an intrusive IA. Preferably, a suitably configured program may run in the application layer 406 that will refrain from sending an IA onward to router 409 if confirmation is not received from a security system that the IA is secure. Thus, this program in application layer 406 could erase the IA or save it in some memory from which the IA will not have access to other routines.

Preferably, the IA identification number is sent via a router 409 to a destination point as described in connection, previous figures. Particularly, it is preferably sent to some arrangement that is adapted to verify the authenticity of the IA identification number as described heretofore.

Although the present invention and several illustrative embodiments have been described herein in connection with the authentication of IA's, it is to be understood that similar principles could be employed in authenticating other entities. For example, similar principles could be utilized to authenticate essentially any program or entity that bears an identification number or some other identifying feature, such as in verifying copyright protection, for instance, by checking that there are no two programs with the same identification number.

It is to be understood that the present invention, in accordance with at least one presently preferred embodiment, includes an identifier, a general register of identification tags and a threshold manager. Together, the identifier, general register and threshold manager may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for authenticating an intelligent agent, said system comprising:
   an intelligent agent, wherein the intelligent agent comprises a computer implemented program packet;
   an identifier which ascertains the location and identity of an entry intelligent agent attempting to gain access to the location, the identity being ascertained via an identification tag associated with the intelligent agent;
   a general register of identification tags corresponding to a plurality of intelligent agents and of possible locations at which the registered intelligent agents may gain access; and
   a threshold manager which permits access, to a given location, of an entry intelligent agent that corresponds to at least one intelligent agent in said general register.

2. The system according to claim 1, wherein said threshold manager is adapted to deny access to an entry intelligent agent that does not correspond to at least one intelligent agent in said general register.

3. The system according to claim 1, wherein said general register comprises a database.

4. The system according to claim 1, wherein said identification tags comprise identification numbers.

5. The system according to claim 1, wherein said threshold manager is adapted to prompt local authentication of an entry intelligent agent in accordance with at least one criterion involving non-recognition of the entry intelligent agent.

6. The system according to claim 5, wherein the local authentication of an entry intelligent agent prompted by said threshold manager includes requesting a digital signature.

7. The system according to claim 1, wherein said threshold manager is adapted to compare the ascertained location of an entry intelligent agent with at least one location in said general register that corresponds to the entry intelligent agent and permits access of the entry intelligent agent to the ascertained location if the ascertained location coincides with one of said at least one location in said general register.

8. The system according to claim 1, wherein said threshold manager is adapted to deny access of the entry intelligent agent to the given location if a time-based criterion is not satisfied.

9. The system according to claim 8, wherein the time-based criterion involves whether the entry intelligent agent has requested access to two different locations within a period of time that is less than a predetermined threshold time value.

10. The system according to claim 1, wherein said identifier includes a position locator system.

11. A method of authenticating an intelligent agent, said method comprising the steps of:
    ascertaining the location and identity of an entry intelligent agent attempting to gain access to the location, the identity being ascertained via an identification tag associated with the intelligent agent, wherein the intelligent agent comprises a computer implemented program packet;
    providing a general register of identification tags corresponding to a plurality of intelligent agents and of possible locations at which the registered intelligent agents may gain access; and
    permitting access, to a given location, of an entry intelligent agent that corresponds to at least one intelligent agent in said general register.

12. The method according to claim 11, further comprising the step of denying access to an entry intelligent agent that does not correspond to at least one intelligent agent in said general register.

13. The method according to claim 11, wherein said general register comprises a database.

14. The method according to claim 11, wherein said identification tags comprise identification numbers.

15. The method according to claim 11, further comprising the step of prompting local authentication of an entry intelligent agent in accordance with at least one criterion involving non-recognition of the entry intelligent agent.

16. The method according to claim 15, wherein said step of prompting local authentication of an entry intelligent agent prompted comprises requesting a digital signature.

17. The method according to claim 11, wherein said step of permitting access comprises comparing the ascertained location of an entry intelligent agent with at least one location in said general register that corresponds to the entry intelligent agent and permits access of the entry intelligent agent to the ascertained location if the ascertained location coincides with one of said at least one location in said general register.

18. The method according to claim 11, further comprising the step of denies access of the entry intelligent agent to the given location if a time-based criterion is not satisfied.

19. The method according to claim 18, wherein the time-based criterion involves whether the entry intelligent agent has requested access to two different locations within a period of time that is less than a predetermined threshold time value.

20. The method according to claim 11, wherein said ascertaining step comprises utilizing a position locator system to ascertain the location of an entry intelligent agent.

21. A program storage device readable by machine, tangibly embodying a program of instructions executable by the machine to perform method steps for authenticating an intelligent agent, said method comprising the steps of:
    ascertaining the location and identity of an entry intelligent agent attempting to gain access to the location, the identity being ascertained via an identification tag associated with the intelligent agent, wherein the intelligent agent comprises a computer implemented program packet;
    providing a general register of identification tags corresponding to a plurality of intelligent agents and of possible locations at which the registered intelligent agents may gain access; and
    permitting access, to a given location, of an entry intelligent agent that corresponds to at least one intelligent agent in said general register.

* * * * *